April 3, 1962    L. W. PARMATER ET AL    3,028,543
AUTOMOTIVE IGNITION SYSTEM TESTER
Filed May 29, 1958    2 Sheets-Sheet 1
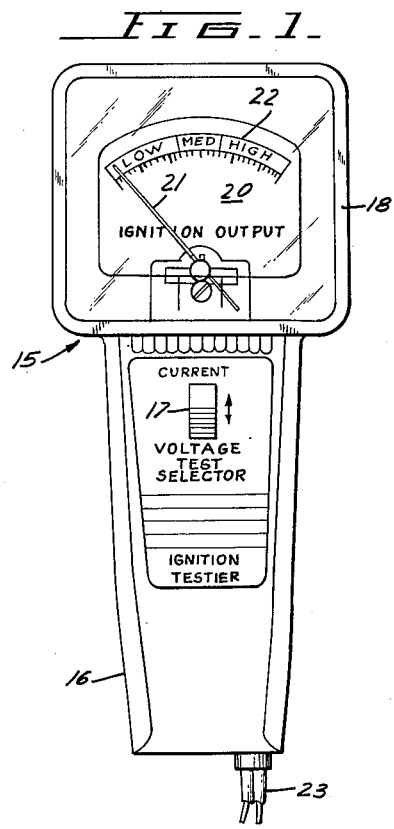
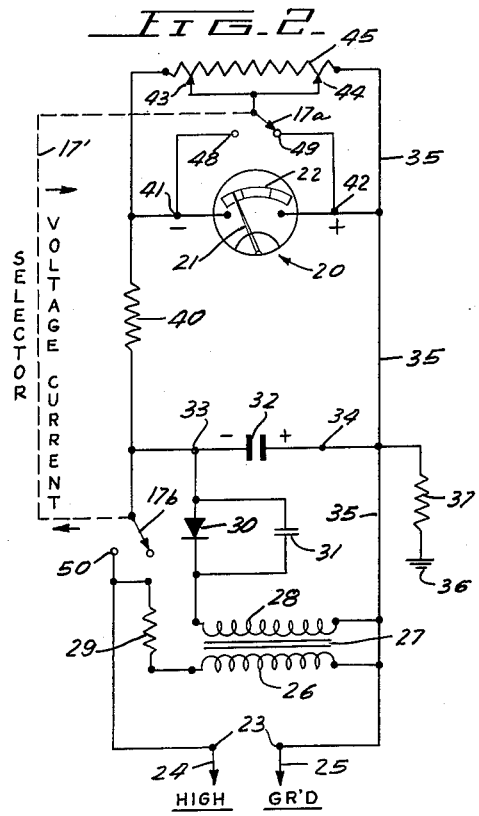
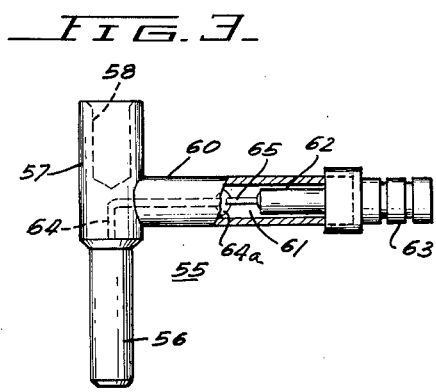
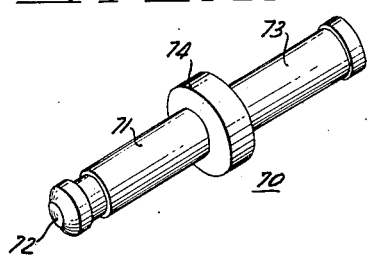
INVENTORS
LEE. W. PARMATER
ROBERT M. CAIN
BY Ostrolenk, Faber,
Gerb & Soffen
ATTORNEYS

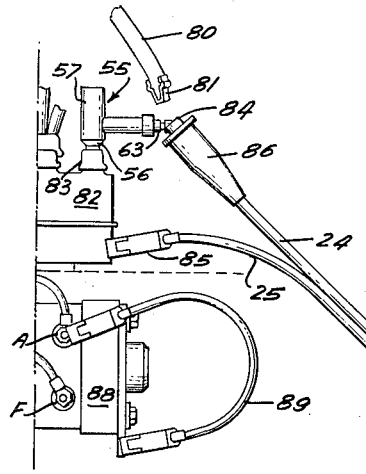
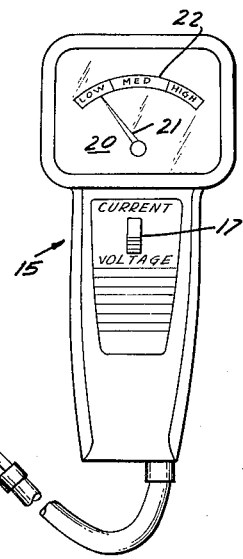
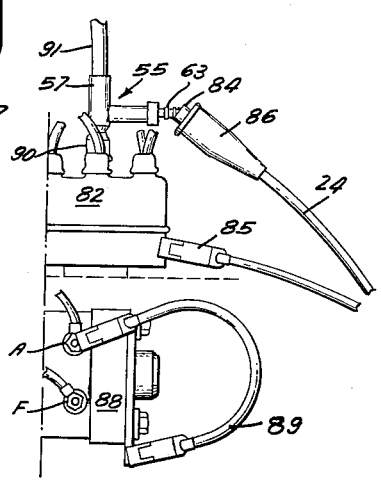
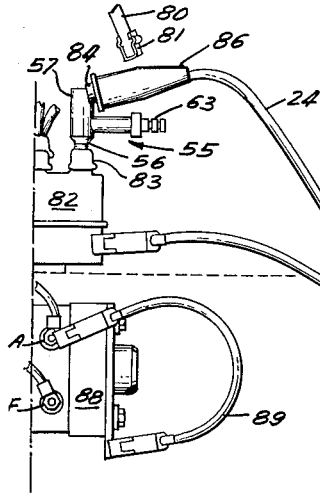
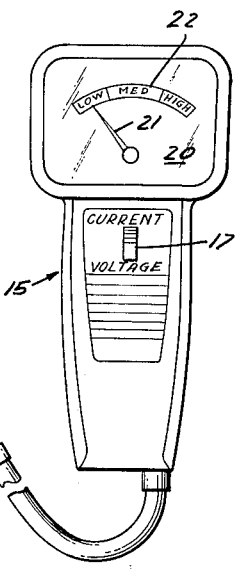
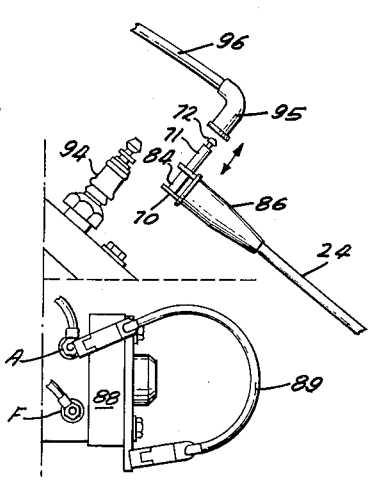

United States Patent Office 3,028,543
Patented Apr. 3, 1962

3,028,543
AUTOMOTIVE IGNITION SYSTEM TESTER
Lee W. Parmater, 10131 Riverview Drive, and Robert M. Cain, 3932 Canterbury Drive, both of Kalamazoo, Mich.
Filed May 29, 1958, Ser. No. 738,674
6 Claims. (Cl. 324—16)

This invention relates to testers for automotive ignition systems and more particularly relates to a novel portable test instrument for directly testing ignition systems while in operation.

The testing of an automobile ignition system generally falls into two categories. One method is to individually test each component in the entire system; the other method involves making the test on the basis of overall results. These methods have their proponents, but in general, the first method has been rapidly losing popularity because it involves making a multitude of individual checks on a multitude of components. The majority of these checks prove to be all right, and when this method does find an occasional faulty part, it does not necessarily follow that the ignition system will thereafter operate perfectly since there may be more than one fault to be found. In other words, where a coil-condenser tester may find a defective coil, the automobile may still fail to operate properly, even with a new coil, if the ignition wires are breaking down to ground.

The overall ignition system testing has not always been considered useful in that many ignition troubles do not appear until the engine is under load, and to obtain this condition while the car is on a garage floor is not easy. Another major problem with this type of tester has been due to the fact that such tests involve the use of specifications, that is, the ignition system performance stated in terms of certain meter readings at a specific speed. Needless to say, any automotive tester that is based on the use of specifications other than those supplied by the car manufacturers themselves is a problem since these so-called specifications are never as definite measurements. Rather they are an accumulation of averages obtained for all models of all makes of cars every year. This information is not made available by car manufacturers, and is actually a rather nebulous thing because it involves not only the output of a particular ignition system, but the characteristics of the testing device as well.

An automotive ignition system is designed to produce and deliver high voltage to the correct spark plug at the correct time. The ignition system consists of a source of power, i.e. battery or generator, an ignition switch, the ignition coil, a distributor, a condenser, spark plugs, and low and high tension wiring.

In accordance with the present invention, the significant operational factors of the ignition system are the voltage and current delivered to the spark plugs. It follows that if the ignition system delivers enough voltage to fire a normal spark plug under all conditions of speed and load, then it has performed its function. There is no need of testing each individual component of the ignition system.

The operation of an ignition coil is such that the voltage produced by the secondary builds up to the point where it will jump the spark plug gap. If the voltage required to jump the gap exceeds the coil capacity then no spark will occur. To test an ignition a coil operating at its full capacity or peak voltage merely requires the removing of one spark plug wire either from the distributor cap or spark plug. Low output of the coil is not only affected by defects in the coil itself but can be caused by faults in the primary or secondary ignition circuits.

The invention tester provides measurements of the overall ignition output, and the information is given in terms of low, medium, and high. The absolute levels of these three conditions are based on reasonable minimums. If on both the current and voltage check the meter pointer reads into the high zone, the problem is shown to be not one of ignition, and the mechanic can look elsewhere for any service trouble.

In practicing our invention we take advantage, in a novel manner, of two fundamental and inherent phenomenon in the operation of an automotive engine. By suitable connection of our novel tester to the engine ignition system, as will be detailed hereinafter, on the current test, the reading levels off as engine speed is increased. This is due to the fact that as engine speed increases, the advance mechanism, although primarily shifting the point and cam relationship, also increases the gap between the rotor and plug wire pins. This latter effect is inherent in the engine's operation. Since this increase of gap with increased speed serves to increase circuit resistance, it results in a leveling-off of current.

On the voltage test arrangement, as will be set forth in detail, the reading also levels off. This is because with increased engine speed there is a diminishing time for the build-up in the coil. This also is an inherent phenomenon and one which the car manufacturers have continually fought. Indeed, it is the very factor that has limited ignition systems for many years.

Thus, we herein make novel and practical use of these two ignition system characteristics. Further, through the use of a suitable level of test circuit sensitivity, we provide a measuring instrument which does not require the continual publishing of "specifications." Our novel ignition system tester readily spots ignition trouble without requiring specialized knowledge on the part of the mechanic.

The invention test instrument is all housed in a hand-held portable unit, with the read-out meter and system switch at one face thereof. The light-weight and ready portability of our instrument herein makes it practical for use about a garage or service station for the automotive testing.

It is accordingly a primary object of our present invention to provide a novel test instrument for automotive ignition system performance.

Another object of the present invention is to provide a novel simple, hand-portable-ignition system tester.

A further object of the present invention is to provide a novel ignition system having a read-out directly indicative of normal overall ignition performance during actual operation.

These and further objects, features and advantages of our invention hereof will become more apparent from the following description of an exemplary embodiment thereof, illustrated in the drawings, in which:

FIGURE 1 is a face view of the exemplary ignition system tester.

FIGURE 2 is a circuit diagram of the exemplary tester.

FIGURES 3 and 4 are adapter units for connecting the tester to an ignition system.

FIGURE 5 is a diagrammatic showing of the connection of the tester for high tension voltage testing of an ignition system.

FIGURE 6 is a diagrammatic showing of the connection of the tester for high tension current testing of an ignition system.

FIGURE 7 is a diagrammatic showing of the connection of the tester for the testing insulation breakdown in an ignition system.

FIGURE 8 is a diagrammatic showing of the connection of the tester for high resistance testing in an ignition system.

FIGURE 1 illustrates the hand-portable feature of the invention tester 15. Tester 15 comprises grip handle 16 about which the mechanic's fingers are gripped. His thumb is near the test-selector switch 17. Motivating switch 17 to the upper position presets the internal circuit for "current" testing, as will be set forth. In the illustrated lower position, switch 17 sets the instrument 15 for "voltage" tests. The "head" 18 of instrument 15 contains a D.C. electrical meter 20 having a pointer 21 that reads relative "ignition output" during test conditions. A scale 22 is divided into three regions: low, medium, and high. Test cable 23 extends from the bottom of the instrument.

FIGURE 2 is a schematic diagram of one form which the circuit of our invention tester 10 may take in practice. The integrator-indicator portion of tester 10, namely the portion used in "multi" cylinder engine testing is that described fully in the aforesaid copending application. The selector switch 17 is shown in the "voltage" position, and comprises a double-pole double-throw switch 17a, 17b interconnected in the diagram by dotted linkage 17'. The test cable 23 comprises "hot" or high lead 24 and "ground" or reference lead 25. Several external connection modes of leads 24, 25 to the ignition system will be described hereinafter in connection with FIGURES 5 to 8. The cable input is applied to the primary winding 26 of transformer 27 through a high series resistor 29. Resistor 29 may be 150,000 ohms.

The secondary winding 28 of transformer 27 connects to a rectifier 30 shunted by a small condenser 31 as .01 mfd. Rectifier 30 may well be a simple crystal diode, such as the type 1N34. The cable input is applied to primary winding 26 of transformer 27 through leads 23, 23. The rectifier 30 output is impressed across an electrolytic bypass condenser 32. Condenser 32 is preferbaly of large capacity, such as 80 mfd., and a low voltage rating. Its negative terminal 33 is connected to the rectifier 30; and its positive terminal 34 to the system reference ground side 35. The system ground connected to the "ground" cable lead 25, and to the instrument metal case, indicated by ground 36 through a resistor 37, as of 150 ohms.

The unidirectional output of rectifier 30 is impressed across the D.C. meter 20, preferably, though not necessarily through a series resistor 40. A suitable value for resistor 40 in the exemplary circuit thereof is 4700 ohms. The negative terminal 41 of meter 20 connects through resistor 40 to the negative terminal 33 of electrolytic condenser 32; its positive terminal 42, directly to the positive condenser 32, terminal 34 through system ground 35. Shunted across meter 20 is a tapped or adjustable resistor 45. Two taps 43, 44 thereof are interconnected by lead 46 to central contact 47 of switch arm 17a.

Switch arm 17a is movable between the "current" contact 48 and "voltage" contact 49 of the basic selector switch 17. Contact 48 connects to the negative side 41 of meter 20; contact 49, to the positive side 42. In this manner a selective insertion of a predetermined resistance value is made electrically across or in shunt with meter 20 in accordance with the switch 17 selected mode of operation. The pre-adjustments of taps 43, 44 on resistor 45 for a given meter 20 provides the two reading sensitivities requisite for the two operational modes, and permits the use of a common scale, as 22. While any suitable resistor or potentiometer arrangement at 45 may be provided, as will be understood by those skilled in the art, we have satisfactorily employed a unit commercially known as a Mallory "Yardohm" therefor.

With the selector 17 in the illustrated position, corresponding to "voltage" measurements by the tester 15, the potential applied between input leads 24, 25 appears across primary winding 26 and series limiting resistor 29. The voltage pulses from the ignition system are translated as electrical pulses across transformer 27 to secondary 28 and through rectifier system 30—32 to meter 20. The rectified D.C. components cause the meter 20 to indicate on scale 22 by pointer 21, with the left portion of shunt resistor 45 across meter 20. Correspondingly, when the selector 17 is in the (left) "current" position, the pulses are also applied across primary 26, but further, through connection by contact 50 with switch arm 17b, is applied across by-pass condenser 32 and the meter 20.

The scale 22 is arranged in three sections, which we have found can be empirically preset for "low," "medium" and "high" performance showings of ignition output, for both the "current" and "voltage" modes. The parameters of: transformer 27 ratio, meter 20 sensitivity, and alternate shunt 45 adjustments are combined to afford a practical trisection scale 22 to include direct, positive, meaningful output readings for the various tests on all automobile engine ignition systems, as will be described hereinafter in connection with FIGURES 5 to 8.

FIGURES 3 and 4 are adapter units for readily connecting tester 15 to conventional engine systems. The T-shaped adapter 55 comprises a metallic connection post 56 for insertion in a distributor for testing use to be described. An extension 57 contains a cavity 58 for receiving the displaced distributor lead in testing as per FIGURE 7. The sleeve 60 of adapter 55 has a hollow interior portion 61 to contain a resistor 62 connected in series between post 56 and tip 63 through a lead 64. In this manner, connection to the distributor through post 56 is made at tip 63 through a suitable series limiting resistor 62, as in FIGURES 5 and 7 for high voltage testing modes. Contact between resistor lead 65 and fixed terminus 64a of lead 64 is preferably by pressure on resistor 62 through its seating between removable tip 63 and terminus 64a. Sleeve 60 is of dielectric material to isolate tips 63 from metal posts 56, 57. Sleeve 60 seats into an opening in upper post 57.

Adapter 70 as seen in FIGURE 4, is a metallic rod having a post 71 with a tip 72 proportioned to fit into the spark-plug lead end of a distributor lead, as seen in FIGURE 8. The opposite post 73 is for an alligator clip connection thereto, with a shoulder 74 mechanically isolating the clip from the distributor lead end. This isolation prevents dislodgement of the lead-end by the clip during testing operations.

In properly testing an ignition system with the tester unit 15 hereof, both the high tension voltage and high tension current tests now to be described must be made. FIGURE 5 diagrammatically illustrates the connections thereof during the high tension voltage test; FIGURE 6, during the high tension current test.

The high tension voltage test includes the entire ignition system with the exception of the distributor cap and spark plug wires. It serves as a quick check of the coil and condenser with the connections to the engine easily made. The complete test can be accomplished by removing one spark plug wire from the distributor cap.

The high tension voltage test is performed as follows:

(1) The most convenient spark plug wire (80) is removed from the distributor 82.

(2) Adapter 55 replaces wire 80 in distributor 81 through its post 56 being inserted in socket 83 in place of the clip 81 at end of wire 80. Wire 80 is left unconnected during the test.

(3) The "high" lead 24 from tester 15 is connected to tip 63 of mounted adapter. Lead 24 has an alligator clip 84 for this purpose, and a protective boot 86.

(4) The ground lead 25 from tester 15 is connected to a convenient engine ground, through alligator clip 85.

(5) The selector switch 17 is moved to the "voltage" position, as seen in the FIGURE 5.

(6) The armature terminal A of the generator 88 is grounded to its casing by a suitable clip lead 89. The armature A grounding should be performed when the engine is stopped.

(7) The automotive engine (not shown) is started, and its speed increased.

(8) The engine speed is increased until the pointer 21 (FIGURES 1 and 2) of meter 20 stops climbing.

The tester 15 circuitry is proportioned so that when the pointer 21 reads in the "high" zone on tri-scale 22, the voltage performance of the ignition system is satisfactory. In some older model automobiles it is found that readings at "medium" may occur for satisfactory operation. In any event if pointer 21 reads off-scale (beyond "high"), or in the "low" zone, it indicates mal-functioning of the ignition system, and further checking of breaks or faults should proceed. If the meter reads in the "high" zone, and in some cases in the "medium" zone, then this "voltage" test is satisfactory, and the "current" test is next performed.

The high tension current test is to determine whether there is excessively high resistance in the secondary circuit, an open in the secondary winding of the coil, or reversed high tension polarity. High tension polarity of the ignition system is always negative to the spark plug, regardless of whether the battery ground is negative or positive.

The "current" test follows the "voltage" test (FIGURE 5), and the circuitry of the "voltage" test is kept intact for progressing to the "current" test. The following further steps are taken, as seen in FIGURE 6:

(9) The automotive engine is slowed down to idle speed.

(10) The selector switch 17 is moved to the "current" position.

(11) The "high" lead 24 is removed from adapter tip 63 and connected to the top post 57. In this manner the series resistor in adapter 55 is bypassed for this test.

(12) The engine speed is thereupon increased until the pointer (21) stops climbing. The top zone reading is made.

The tester 15 circuitry is proportioned so that when the pointer 21 reads in the "high" zone on scale 22 (and in some older car models even in the "medium" zone), the ignition system test herein is satisfactory. If pointer 21 reads in the "low" zone, or even moves to the left below scale, further checking and trouble-shooting on the system must be performed.

The invention tester 15 may be used for further testing in the ignition system, particularly in the spark plug wire section. The following test, diagrammed in FIGURE 7, will disclose insulation breakdown of the spark plug wires, and a defective distributor cap.

(1) The T-adapter 55 is inserted in series between the center tower 90 of the cap of distributor 82 and the ignition coil (not shown) through wire 91. Coil wire 91 is inserted in post 57.

(2) The "high" lead 24 is connected to the adapter tip 63 through clip 84.

(3) The "ground" clip 85 is connected to engine ground.

(4) The armature A of generator 88 is grounded through clip lead 89 when engine is off.

(5) The selector switch is moved to the "voltage" position.

(6) A spark plug wire is disconnected at its spark plug end.

(7) The engine is started up, and its speed increased until pointer 21 stops climbing.

(8) The engine speed, per step 7, at top reading, is maintained, and one spark plug wire at a time is successively disconnected at spark plug end.

The meter 20 readings should be the same when each spark plug wire is disconnected. One or more low readings, with the rest normal, indcates wire insulation is defective in the wire that reads low or the distributor cap is shorted.

The above described spark plug wire section test, in conjunction with FIGURE 7, may be extended to check high resistance thereof. High resistance can be determined by checking the average current to the spark plugs and comparing them to each other. When the tester 15 is connected to the spark plug terminal, the plug is shorted and does not fire. The spark plug condition will not affect this reading, therefore, this test can be made with the spark plug wire either connected or disconnected.

Molded boots on the spark plug end of the wire make it impractical to make a test connection without the use of an adapter. By connecting the "high" lead 24 to the straight adapter 70 and holding the spark plug wire with the insulated pliers, it is possible to insert the adapter 70 into the wire terminal.

FIGURE 8 indicates the connection of booted spark plug wire end 95 just prior to the insertion of adapter tip 72 therein. The clip 84 grips the post (73) of adapter 70. The spark plug 94 remains unconnected to its wire 96 for its test herein. In some cases the clip 84 may be connected to the electrical portion of cap 95, whereby the use of adapter 70 is dispensed with. The engine speed is then increased until pointer 21 reads in the center of scale 22. This engine speed is maintained, and each spark plug wire is successively tested as described for wire 96. For proper resistance conditions in the spark plug system, each spark plug wire (96) reading on scale 22, at the stated engine speed should be the same within a small range, e.g. 10 percent. Low or uneven readings indicates trouble in the particular wires involved.

While we have described and illustrated our invention test unit and circuit for exemplary purposes, it is to be understood that modifications thereof, or in its use, may be made by those skilled in the art, and that it is not intended to be limited except as set forth in the following claims.

We claim:

1. An ignition system test unit comprising a transformer with its primary winding connected to input test leads connectible to the ignition system, one of said leads being at the high circuit side, rectifier means coupled to the secondary winding of said transformer to derive a unidirectional potential proportional to the system input to the transformer, a meter in circuit with said rectifier means to indicate relative performance of the ignition system, and a selector switch to selectively connect said high lead to the rectifier output during current determinations on the system.

2. An ignition system test unit as claimed in claim 1, further including resistor means in circuit with said selector switch for altering the sensitivity of indication of said meter in accordance with the test mode of the unit.

3. An ignition system test unit as claimed in claim 1, further including a tapped resistor in shunt connection across said meter and in circuit with said selector switch for altering the sensitivity of indication of said meter to correspond to voltage and current determinations by the unit on the ignition system.

4. An ignition system test unit as claimed in claim 3, wherein said meter has a pointer and a scale with a substantial upper region over which the pointer readings designate satisfactory ignition system operation, said transformer, rectifier means and meter are proportioned and correlated to motivate said pointer to said upper scale region for satisfactory system operation.

5. An ignition system test unit comprising a transformer with its primary winding connected to input test leads connectible to the ignition system, rectifier means coupled to the secondary winding of said transformer to derive a unidirectional potential proportional to the system input to the transformer, and a meter in circuit with said rectifier means to indicate relative performance of the ignition system; a resistor means connectible to said meter in different circuit configurations for altering its indication sensitivity in accordance with a first and a second test mode of the unit; said resistor means having individual first and second adjusting means for calibrating said meter in said first and said second test modes, respectively; and means exclusive of said resistor means establishing a current path between said first and said second adjusting means.

6. An ignition system test unit comprising a transformer with its primary winding connected to input test leads connectible to the ignition system, rectifier means coupled to the secondary winding of said transformer to derive a unidirectional potential proportional to the system input to the transformer, and a meter in circuit with said rectifier means to indicate relative performance of the ignition system; said rectifier means including an electrolytic condenser and a semi-conductor device, said condenser, said semi-conductor device, and said secondary winding serially connected to form at least a part of a closed loop circuit.

References Cited in the file of this patent
UNITED STATES PATENTS

| | | |
|---|---|---|
| 1,617,145 | Brown | Feb. 8, 1927 |
| 2,052,952 | Thomas | Sept. 1, 1936 |
| 2,241,731 | Mitchell | May 13, 1941 |
| 2,254,080 | McCarty | Aug. 26, 1941 |
| 2,257,958 | Holcombe | Oct. 7, 1941 |
| 2,383,557 | McClellan et al. | Aug. 28, 1945 |
| 2,425,321 | Horton | Aug. 12, 1947 |
| 2,448,452 | Morelock | Aug. 31, 1948 |
| 2,497,669 | Haley | Feb. 14, 1950 |
| 2,547,248 | Bartholomew | Apr. 3, 1951 |
| 2,703,376 | Board | Mar. 1, 1955 |
| 2,712,633 | Jameson | July 5, 1955 |
| 2,732,533 | Andrews et al. | Jan. 24, 1956 |
| 2,938,161 | Schafer | May 24, 1960 |

FOREIGN PATENTS

| | | |
|---|---|---|
| 497,470 | Italy | Sept. 14, 1954 |
| 549,639 | Italy | Oct. 16, 1956 |